Patented Sept. 3, 1929.

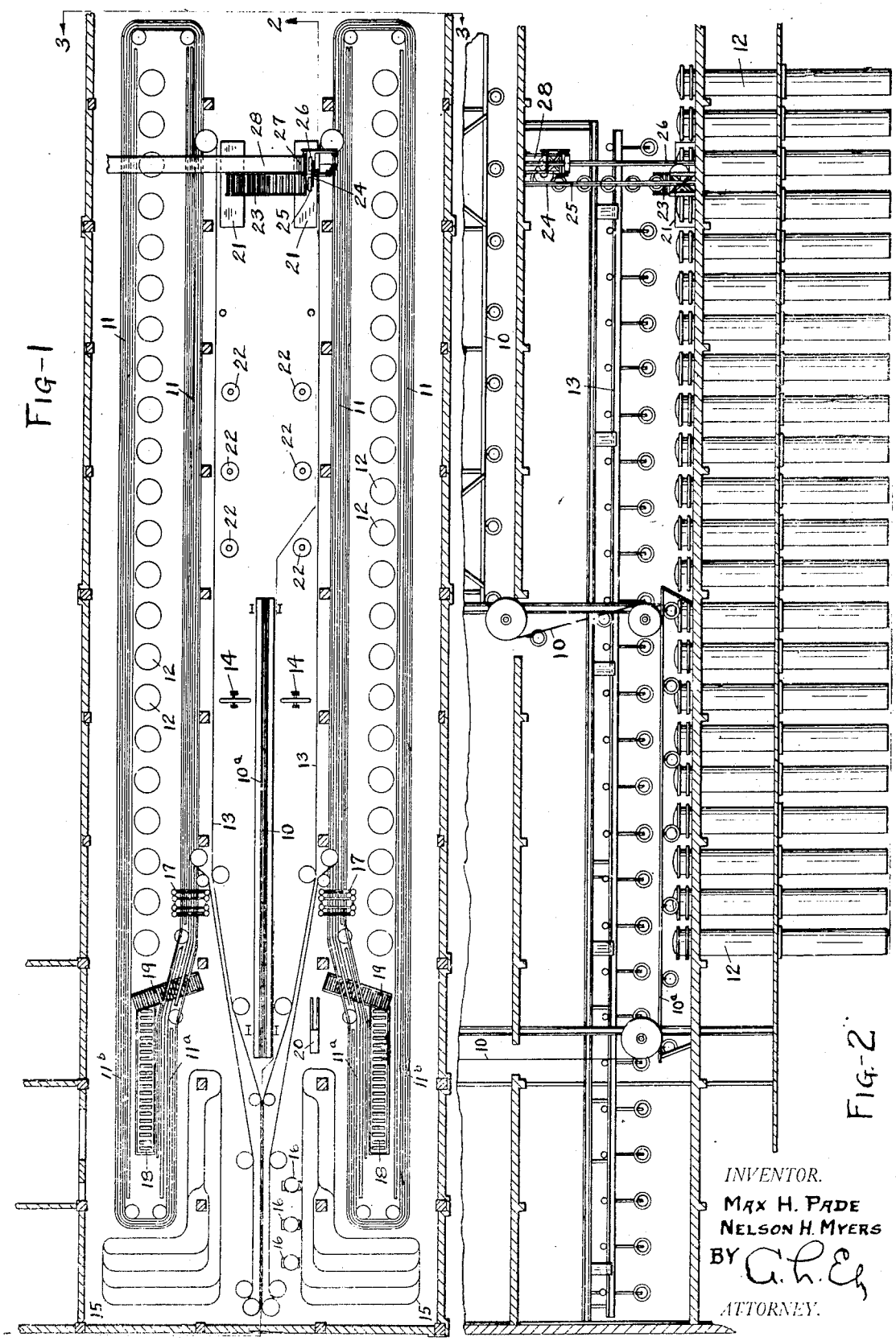

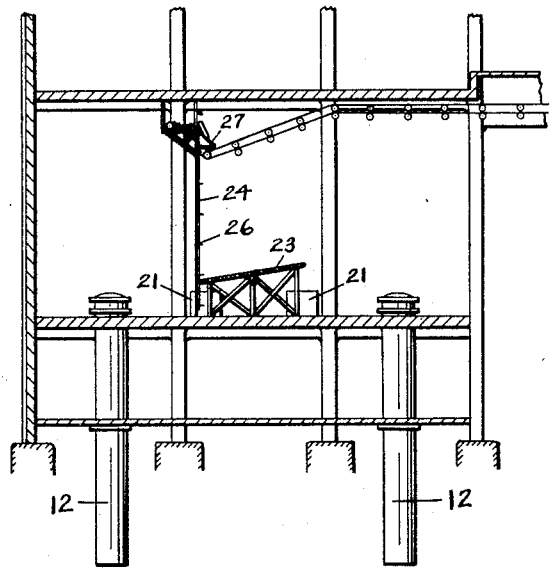
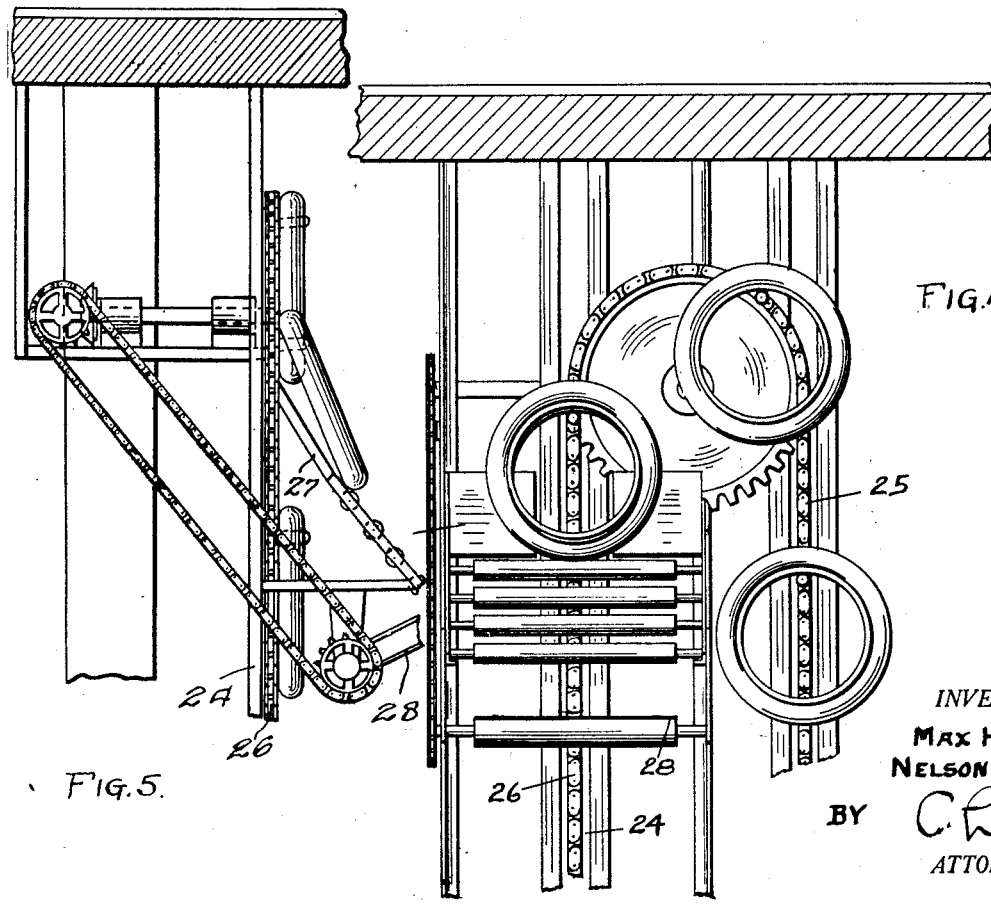

1,727,313

UNITED STATES PATENT OFFICE.

MAX H. PADE AND NELSON H. MYERS, OF AKRON, OHIO, ASSIGNORS TO THE FIRESTONE TIRE AND RUBBER COMPANY, OF AKRON, OHIO, A CORPORATION OF OHIO.

CONVEYER.

Application filed September 26, 1925. Serial No. 58,826.

This invention relates to conveyers for certain classes of articles, and particularly to a conveyer layout for heater press rooms where pneumatic tires are vulcanized according to the present practice in large modern tire plants, and generally to that type of layout disclosed in United States Letters Patent No. 1,535,338, granted April 28, 1925, and especially to an improved combination of conveyers facilitating the handling of cord tires supplied to a known type of tire mold conveyer used in connection with the heater presses for facilitating enclosing the tires in the molds, feeding them to and from the presses, opening the molds, removing the vulcanized tires, and cleaning or lubricating the molds.

The chief object of the invention is to provide in a system including a tire mold conveyer and a tire conveyer for supplying cord tires containing pressure bags to the mold conveyer and for conducting the finished tires to a point where the pressure bags are removed, a conveyer system arranged to pass said point for conducting the completed tires from the curing room to the inspecting, cleaning and wrapping departments.

Another object is to provide an improved system of conveyers for handling apertured articles and particularly for elevating tires from the curing room and delivering them to the inspection department.

The foregoing and other objects are obtained by the construction illustrated in the accompanying drawings and described in detail below. It is to be understood that the invention is not limited to the specific construction shown and described, nor to the particular uses set forth.

Of the accompanying drawings:

Figure 1 is a plan of the conveyer layout in a curing room having two systems of conveyers arranged beside each other therein, the one being adapted for straight side cord tire production and the other for clincher cord tire production;

Figure 2 is a section along line 2—2 of Figure 1;

Figure 3 is a section on line 3—3 of Figure 1;

Figure 4 is an enlarged side elevation of a portion of the elevating conveyer; and Figure 5 is an enlarged front elevation thereof.

Referring to the drawings, 10 denotes a tire conveyer traveling from the tire building departments, to the heater room over a delivery run 10$^a$ and back to the building departments. The delivery run 10$^a$ is arranged midway between similar tire mold conveyers 11, 11, each surrounding a series of heater presses 12, 12, and also midway between similar tire conveyers 13, 13 arranged for cooperation respectively with each mold conveyer 11.

The tire conveyers 13 are arranged to receive raw tires removed from conveyer 10 and into which air or other pressure bags have been inserted for expanding the tires in the molds during the curing process by means of inserting devices illustrated at 14, 14 and to deliver said tires adjacent to storage conveyers 15, 15 on which the tires may be treated with soapstone, or the like, preliminary to insertion in the molds. For making clincher tires, bull ring applying presses 16, 16 are arranged between the conveyers 13 and one storage conveyer 15.

The storage conveyers 15 are so arranged as to deliver the soapstoned tires to the mold filling and closing stations 11$^a$, 11$^a$ of the mold conveyers 11 which conduct the molds from the filling stations through the mold closing presses 17, 17 to the heaters 12, and from the heaters 12 after vulcanization to the mold opening, tire removing and mold cleaning stations 11$^b$, 11$^b$, in the usual manner.

Arranged adjacent the stations 11$^b$ there are installed gravity conveyers 18, 18 for receiving the vulcanized tires containing the air bags and delivering them to power driven conveyers 19, 19 which deliver the vulcanized tires to a point adjacent conveyers 13. For use with clincher tires, a bull ring removing device 20 is also stationed adjacent the point of delivery of the tires from one conveyer 19. Conveyers 13 are adapted to receive the vulcanized tires containing the pressure bags at this point and to conduct them to bag removing stations 21, 21 and also to receive the bags removed at stations 21 to conduct them past bag treating stations as at 22, 22 to the bag inserting devices 14 where they are again inserted in raw tires removed from conveyer 10.

Stations 21 are connected by gravity conveyer 23 arranged to deliver tires removed from the bags at either station to an elevating conveyer 24 (see Figures 3 and 4). This conveyer includes an upwardly traveling run 25 and a downwardly traveling run 26, the latter having cooperating therewith adjacent the top thereof, an inclined take-off conveyer 27 arranged to engage under a tire on conveyer 26 and to remove and conduct it from said conveyer 26 onto a horizontal conveyer 28 leading to the inspection department on a higher floor of the factory.

The path of the tires through the system will be evident from the foregoing description. It will be seen that an effective conveyer system has been devised for feeding the vulcanized tires to an elevator conveyer, and for removing the tires from the elevator onto a horizontal conveyer for delivery to the department in which they are prepared for shipment.

Modifications of the invention may be resorted to without departing from the spirit thereof or the scope of the appended claims.

What is claimed is:

1. Apparatus for conveying annular articles, comprising a gravity conveyer, an elevating conveyer adapted to remove articles from the gravity conveyer by engaging in the central openings of the articles, said elevating conveyers including upwardly and downwardly traveling runs, and means for removing the articles from the top of the conveyer by engaging the articles on both sides of the central opening comprising a second gravity conveyer inclined in the path of the articles as they start on the downward run of said conveyer, and a horizontal conveyer on which said articles are delivered by said second gravity conveyer.

2. Apparatus for conveying annular articles, comprising an elevating conveyer including upwardly and downwardly traveling runs having means therein for engaging the articles through their central openings, and means for removing the articles from the top of the conveyer, comprising a gravity conveyer inclined in the path of the articles a they start on the downward run of said conveyer to engage the articles on both sides of the central openings, and a horizontal conveyer on which said articles are delivered by said gravity conveyer.

3. Apparatus for conveying annular articles, comprising an elevating conveyer including upwardly and downwardly traveling runs having means therein for engaging the articles through the central openings thereof, and means for removing the articles from the top of the conveyer, comprising a gravity conveyer inclined in the path of the articles as they start on the downward run of said elevating conveyer, said conveyer being constructed to engage the article on both sides of the downward run of the elevating conveyer.

4. Apparatus for handling articles having apertures therein, comprising a downwardly traveling conveyer having means for suspending the articles thereon by engagement through the apertures thereof and an inclined gravity conveyer extending into the path of said articles on opposite sides of the suspending means for removing the same from said means.

MAX H. PADE.
NELSON H. MYERS.